Feb. 24, 1925.

B. KLUM

SCRAPER

Filed April 24, 1923

1,527,561

Inventor

Blaine Klum,

By Edson Bros.

Attorneys

Patented Feb. 24, 1925.

1,527,561

UNITED STATES PATENT OFFICE.

BLAINE KLUM, OF OAKLAND, CALIFORNIA.

SCRAPER.

Application filed April 24, 1923. Serial No. 634,258.

*To all whom it may concern:*

Be it known that I, BLAINE KLUM, a citizen of the United States, residing at Oakland, in the county of Contra Costa and State of California, have invented certain new and useful Improvements in Scrapers, of which the following is a specification.

This invention relates to scrapers, and particularly to such scrapers as are used for scraping billboards.

One object of the present invention is to provide such a scraper with a cutting surface that will hold the tool to the surface of a billboard.

Another object is to provide a scraper with a flexible blade having scalloped cutting edges, to facilitate tipping of the blade under pressure whereby the blade can more readily take a fresh hold continuously, and thus increase the cutting surface.

A further object is to provide a scraper having a shape that will tend to widen the incision it makes and thereby remove a greater surface at a single stroke, and also having a shape to facilitate scraping the corners of a billboard.

A still further object is to provide a scraper capable of making a shearing cut that will decrease the amount of work required to scrape a billboard, that will save time and operate with maximum efficiency.

Other and further objects and advantages will appear from the following detailed description of the invention, taken in connection with the accompanying drawings, which illustrate by way of example a preferred embodiment of the invention, but which are not to be construed as a definition of the limits of the invention, reference being had to the appended claims for that purpose.

In said drawings.

Figure 1:
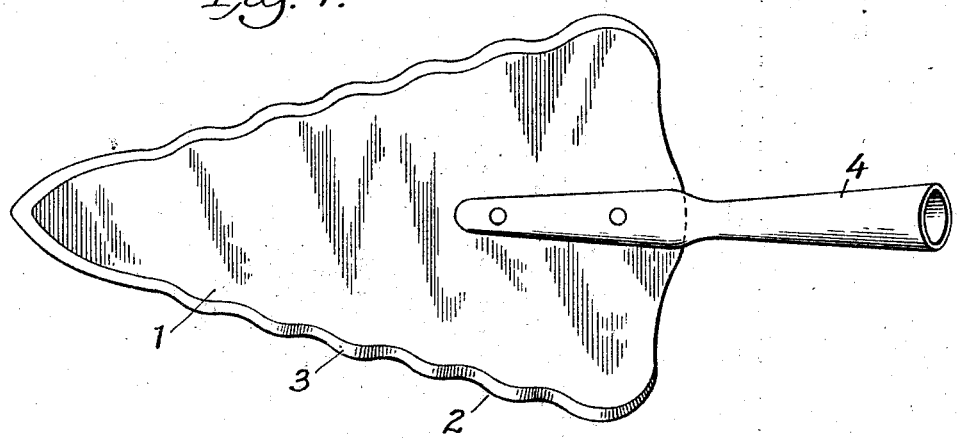
Fig. 1 is a top plan view of a preferred form of scraper constructed in accordance with the present invention.
Figure 2:
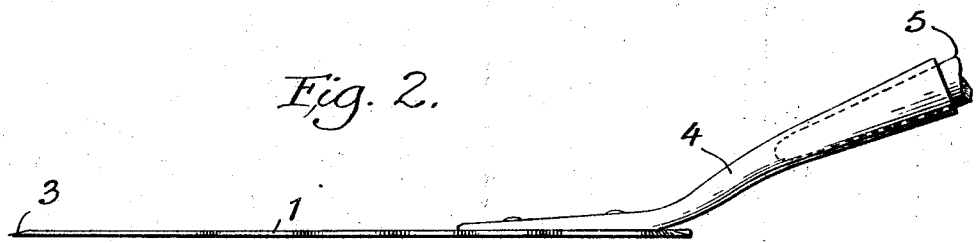
Fig. 2 is a side elevation thereof.
Figure 3:
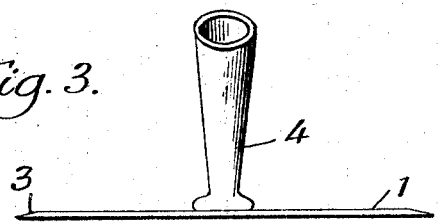
Fig. 3 is a rear elevation.

The flexible blade portion 1 of the scraper is shown substantially in the form of a triangle, and is provided with the scalloped or indented edges 2, which formation permits a tipping or bending of the blade under pressure, and facilitates the continuous taking of a fresh hold by the scraper as it is moved across the object to be scraped.

The substantially triangular shape of the scraping portion not only permits the easy scraping of corners, but has the effect of widening the size of the strip as it is scraped off, and thereby results in the removal of a continually widening surface after an opening has been made with the point of the tool. This is especially advantageous in removing portions of paper under which air bubbles have formed, and where owing to irregularities the paper is not in close contact with the billboard.

The cutting edge 3 is formed, as indicated, by bevelling off the top surface of the scraping portion downwardly and outwardly toward the bottom surface, so that the lower plane of the cutting edge is simply a continuation of the bottom surface of the scraper. The cutting edge is thereby formed on the back or bottom of the blade, and not in the center of the edge of the blade. This enables the scraper to be placed flat on a billboard and moved along it, holding it to the billboard or other object to be scraped, which it would not do if the cutting edge were formed by bevelling off both the top and bottom edge surfaces of the scraper. As the blade bends, the cutting edges tip more toward the billboard, and thereby continue to take fresh hold, this increasing the cutting surface.

Secured in any suitable way to the top surface of the scraper 1 is a handle or handle securing means, here shown in the form of a socket 4, secured in any suitable way, as by rivets 5, to the scraping portion 1, the open end of said socket portion being raised, or extending both upwardly and outwardly from the scraper proper in order to leave room for the hand or fingers of the operator when the scraper is placed with its bottom surface flat with the object to be scraped.

Secured within the socket portion 4 is a handle or grip 5, which is grasped by the operator of the scraper. The socket could, of course, be formed in the handle 5, in which case the part 4 would extend thereinto and be secured therein in any suitable way.

I claim:

1. A scraper for billboards or the like comprising a relatively flat substantially triangular flexible portion, the edges of said portion being scalloped and bevelled outwardly to form a cutting edge, one side of said cutting edge lying in the plane of the bottom surface of said flexible portion and a handle associated with said flexible portion and arranged entirely on the upper side of said flexible portion.

2. A scraper for bill boards or the like comprising a relatively flat, scraping portion adapted to have its entire under surface rest upon the surface to be scraped, said scraping portion having a cutting edge, one face of which is formed by and in the plane of the bottom surface of said scraping portion, said scraping portion being substantially triangular in shape whereby a small incision, made by the point of the scraper, will be widened as the scraper is forced into it.

3. A scraper for billboards or the like comprising a relatively flat substantially triangular flexible blade adapted to have its entire under surface rest upon the surface to be scraped, said scraping blade having its cutting edges scalloped to improve the efficiency of said cutting edges and to facilitate flexing of the blade.

In testimony whereof I affix my signature.

BLAINE KLUM.